Sept. 20, 1971 R. F. HOMEIER ET AL 3,605,627

ESCORT MEMORY FOR TROLLEY CONVEYOR

Filed July 23, 1969 4 Sheets-Sheet 1

INVENTORS
RONALD F. HOMEIER
WILLIAM A. SIMMONS
BY
F. W. Anderson
C. E. Tripp
ATTORNEYS

ESCORT MEMORY FOR TROLLEY CONVEYOR

Filed July 23, 1969 4 Sheets-Sheet 2

Sept. 20, 1971 R. F. HOMEIER ET AL 3,605,627

ESCORT MEMORY FOR TROLLEY CONVEYOR

Filed July 23, 1969 4 Sheets-Sheet 3

ESCORT MEMORY FOR TROLLEY CONVEYOR

United States Patent Office 3,605,627
Patented Sept. 20, 1971

3,605,627

ESCORT MEMORY FOR TROLLEY CONVEYOR

Ronald F. Homeier, Plainfield, and William A. Simmons, Indianapolis, Ind., assignors to FMC Corporation, San Jose, Calif.

Filed July 23, 1969, Ser. No. 844,025
Int. Cl. B65g *17/42*
U.S. Cl. 104—88 14 Claims

ABSTRACT OF THE DISCLOSURE

A trolley conveyor is provided with a fluid operated code reading unit adjacent each of a plurality of switch gates that are movable to divert a trolley from the main track to a spur track. Each trolley carries a destination coding or escort memory unit which is preset to match the code of one of the code reading units. Each code reading unit has its own fluidic sensing and logic circuit. When the destination code matches, the logic circuit of the code reading unit moves the adjacent switch gate to divert the trolley onto the spur track.

BACKGROUND OF THE INVENTION

Trolley conveyors for heavy duty operations may be subject to shock, extremes of temperature and humidity, and other environmental conditions which are likely to be detrimental to control elements associated with the system to govern the movements of the trolleys. These conditions can be particularly troublesome in trolley conveyor control systems which use electrical switches, relays and the like, in conjunction with other control elements that automatically route a selected trolley to a preselected station or to a spur track branching off the main track. To avoid these problems, some known trolley conveyor control systems have used mechanical elements to set a destination code on a device carried by the trolley, and mechanical elements in a code reader at the destination for the trolley. This general type of system is disclosed in the Freeman Pat. 2,803,333. The mechanical escort memory devices are usually limited by the physical space required for the number of destination codes that can be selected on its coding device. The electronic systems are not so limited, but are characterized by substantial complexity which is reflected in initial cost, reliability and maintenance. All of these factors are much less significant in the fluidic escort memory apparatus of the present invention; the apparatus is less expensive, more reliable, easier to maintain and less prone to environmental failure than electronically operated systems.

Fluid power systems, one miniaturized type of which is now generally recognized by the term "fluidic," have replaced some electronic installations for control and logic functions, and have proven reliable and trouble free under conditions which are detrimental to electrical components. The present invention concerns an escort memory fluidic control system for governing the switching of individual trolleys in a trolley conveyor installation in which the trolleys are power driven along a main track and are selectively switched onto spur tracks intersecting the main track.

SUMMARY OF THE INVENTION

The present invention provides a fluidic-controlled trolley conveyor system including a destination coding unit mounted on each trolley and a station code reading unit mounted near each spur track intersecting the main track. The coding unit is provided with code buttons which in active condition will both block and open selected air passages of the code reading unit. As the moving coding unit passes one of the code reading units, the coding buttons are briefly vertically aligned with similar patterns of superjacent air sending and subjacent air receiving passages of the code reading unit. If the pattern of coding buttons matches the pattern of air passages, a fluidic control circuit individual to this code reading unit is actuated by the air to switch a movable section of the track and divert the trolley onto a spur track. Features of the invention include improved reliability over electronic and other control systems because both the sensing and logic functions are performed with a minimum of moving parts, without electrical shock or explosion hazard, and because the controls can be used in temperature and humidity environments which in conventional systems require special protection for the controls.

DESCRIPTION OF THE PREFERRED EMBODIMENT

Figure 1:
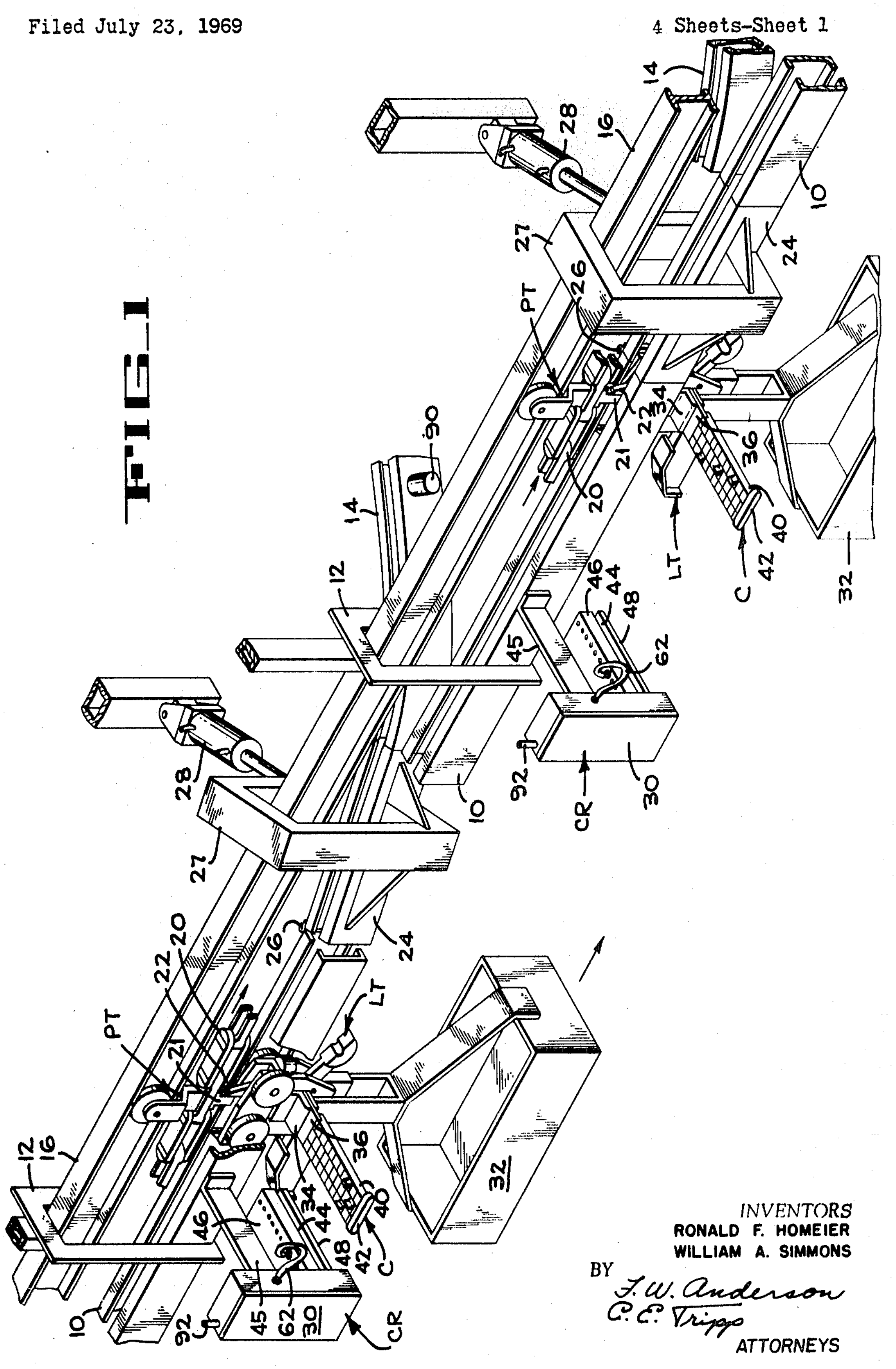
FIG. 1 is a diagrammatic perspective of a section of a trolley conveyor system which includes the escort memory apparatus of the present invention.

FIG. 1 illustrates a short section of a power and free trolley conveyor installation including a main track 10 suspended from overhead hangar brackets 12, and the inlet portions of spur tracks 14. Mounted over the track 10 is an I-beam rail 16 that supports a plurality of power trolleys PT which are interconnected by a power driven chain 20, here broken away to show otherwise concealed structure. The tracks 10 and 14 carry load trolleys or carriers LT which are pushed by the power trolleys when the load trolleys are moving along the main track 10. This is a known trolley conveyor arrangement and is only representative of one conveying system in which the present invention is useful. Details of the conveyor arrangement are the same as those in pending application Ser. No. 796,676 which has the same assignee as the present invention and is incorporated by reference into this disclosure. For the present purpose, it is sufficient to state that the power trolleys are each provided with a depending lug 21 which is arranged to engage an upstanding lug 22 of a load trolley. This propels the load trolley, but permits it to be readily routed onto one of the spur tracks.

Intermediate each spur track 14 and the main track 10 is a switching track 24 which is pivoted to the main track by a hinge 26. The switching track is connected to a rectangular frame 27 which extends around the rail 16 and is swung horizontally by an air cylinder 28 so that the free, downstream end of the switching track 24 aligns with either the main track 10 or the spur track 14. Each air cylinder 28 is governed by an associated fluidic control circuit, shown in FIG. 5, which is part of a code reading unit CR and is mounted within an enclosure 30 located upstream of the switching track 24. Each load trolley LT is provided with a coding unit C that travels through each code reading unit CR. If the present code patterns of the units C and CR match, the switching track 24 is actuated to divert the load trolley LT onto the adjacent spur track 14. Each load trolley LT may carry a box 32 or similar means for conveying work pieces among various work stations along the paths of the main track and the spur tracks.

An angle bar 34 on the load trolley LT is secured to a laterally extending mounting block 36 that is capable of limited up or down flexure, but is horizontally inflexible. One suitable material for the mounting block 36 is a small section of heavy duty conveyor belting formed of rubber or neoprene impregnated cloth. The mounting block might alternatively be a thin spring steel plate. Secured to and extending outward from the mounting block normal to the general vertical plane of the load trolley is the coding or escort memory unit C which governs the destination of the load trolley LT. Because the trolley, when loaded and moving, may tend to swing slightly sideways, the coding unit C is capable of being maintained in a substantially horizontal plane by flexure of the mounting block 36 irrespective of swinging movement of the load trolley when it passes through each of the code reading units CR.

The coding unit C (FIG. 2) includes an elongate body 40 which on its outer end carries a guide shoe 42. Rounded off on its leading end, as shown in FIG. 1, the shoe 42 elevationally aligns the end portion of the body 40 in a vertical gap at 44 (FIGS. 3 and 4) of the code reading unit CR. The code reading unit CR is mounted on a fixed bar 45 from the track 10 (FIG. 1), and the gap 44 is defined by an air supply manifold 46, and by a subposed air receiver plate 48.

Figure 2:
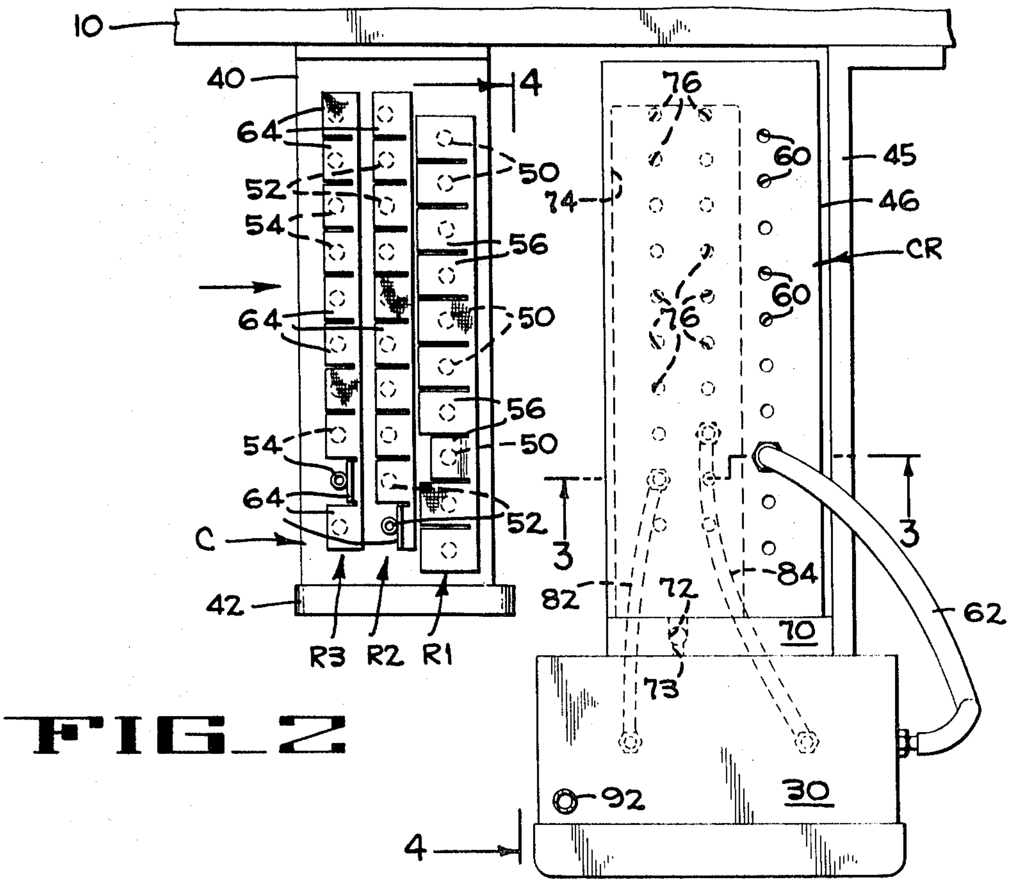
FIG. 2 is an enlarged diagrammatic fragmentary plan showing one of the trolley coding units approaching one of the stationary code reading units.
Figures 3, 4:
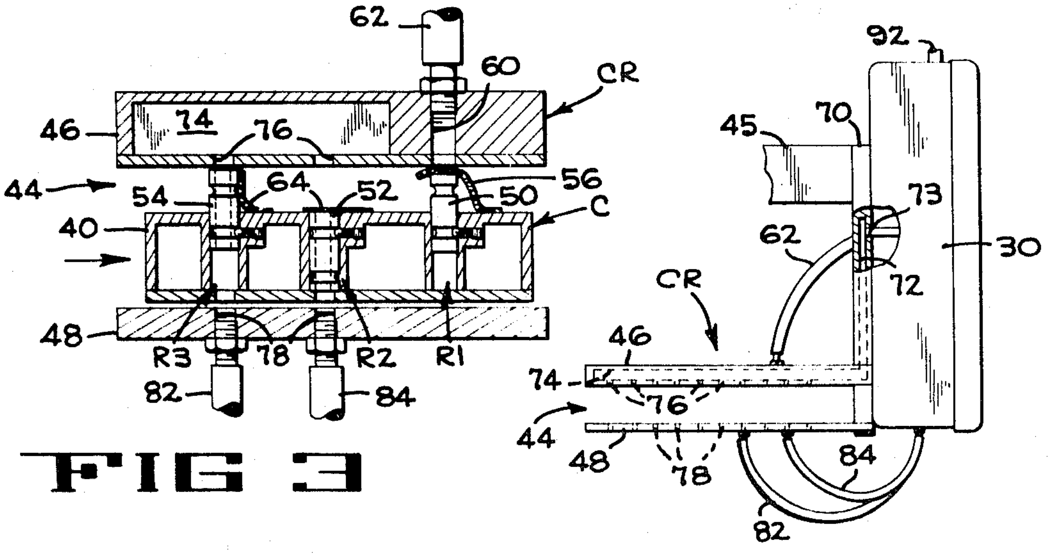
FIG. 3 is a diagrammatic section taken along lines 3—3 on FIG. 2, and includes a trolley coding unit in a position in which it may actuate a fluidic control circuit to divert the trolley.
FIG. 4 is a diagrammatic elevation, at reduced scale, of the code reading unit indicated by the lines 4—4 on FIG. 2.

With continued reference to FIGS. 2 and 3, the body 40 of the coding unit C is provided with three rows of control elements that extend longitudinally of the body and transverse to its direction of movement. A row R1 of selector or conditioning buttons 50 comprise the leading row, and rows R2 and R3 comprise tubular coding buttons 52 and 54, respectively. The coding buttons are tubular in order to conduct air, in a manner and for a purpose later described. The selector buttons 50 are movable between raised active and lowered inactive positions and each underlie a flexible tab 56. The leading edge of the tab (FIG. 3) is secured to the body 40, and when a button is raised to an active position, the raised tab 56 forms a sliding seal with one of a plurality of air passages 60 of the air supply manifold 46. If this particular air passage is being supplied with air under pressure from an air supply tube 62 which can be connected to any one of the air passages 60, a back pressure is created in the tube 62. This air pressure conditions the fluidic control circuit to "read" the coding buttons 52 and 54. Thus, one raised selector button 50 corresponds to the first digit of a three digit code and causes a particular code reading unit CR to sense for the remaining digits.

Coding buttons 52 and 54 are detent controlled in the manner of the selector buttons 50 and are movable between raised and lowered positions. The coding buttons are tubular and function in raised position to transmit air under pressure from the air supply manifold 46, through the body 40 of the coding unit C, and into the air receiver plate 48. Each coding button in lowered position underlies and is sealed by a flexible flapper valve tab 64 having its leading edge secured to the coding unit body 40, while in a raised position the tab flexes aside to open the bore of the coding button.

As shown in FIGS. 2 and 4, the mounting bar 45 is secured to a vertical bar 70 which is provided with an air passage 72. Passage 72 communicates at 73 (FIG. 4) with the fluidic control circuit in the cabinet 30, and with a plenum chamber 74, the lower portion of which is defined by a plate having a pattern of air outlets 76 which matches the pattern of rows R2 and R3 of coding buttons 52 and 54. Thus, when a coding button is in its first raised, active position, as shown for the button 54 (FIG. 3), the hollow coding button provides a flow path for transferring air from the plenum chamber to a subposed air outlet 78. The outlets 78 are formed in the air receiver plate 48 and are threaded so that air receiver conduits 82 and 84 can be coupled to any two outlets 78.

A general summary of the structure thus far described is that the body 40 of the continuously moving coding unit C moves through the gap 44 of the code reading unit CR. If a selector button 50 on the coding unit is in a raised, active position and aligns with the particular aperture 60 to which the air supply tube 62 is connected, a back pressure in the thus blocked air supply tube 62 causes air to be directed into the plenum chamber 74 and the air issues from all of the open plenum chamber outlet passages 76. Two of the passages 76 are connected to the fluidic circuit by means of the conduits 82 and 84. If the coding buttons 52 and 54 for these same two passages are in raised, active positions, they transfer air into the fluidic circuit and the adjacent air cylinder 28 is energized to pivot the switching track 24 out of alignment with the main track 10 and into alignment with the spur track 14 so that this particular load trolley LT is diverted to the spur track. An air switch 90 (FIG. 1) is held open by the last trolley which can be stored on the spur track. This prevents further trolleys from being diverted onto that spur track by maintaining the switching track 14 in alignment with the main track 10. Excess trolleys are thus recirculated on the main track until there is room for them on the appropriate spur tracks.

Figure 5:
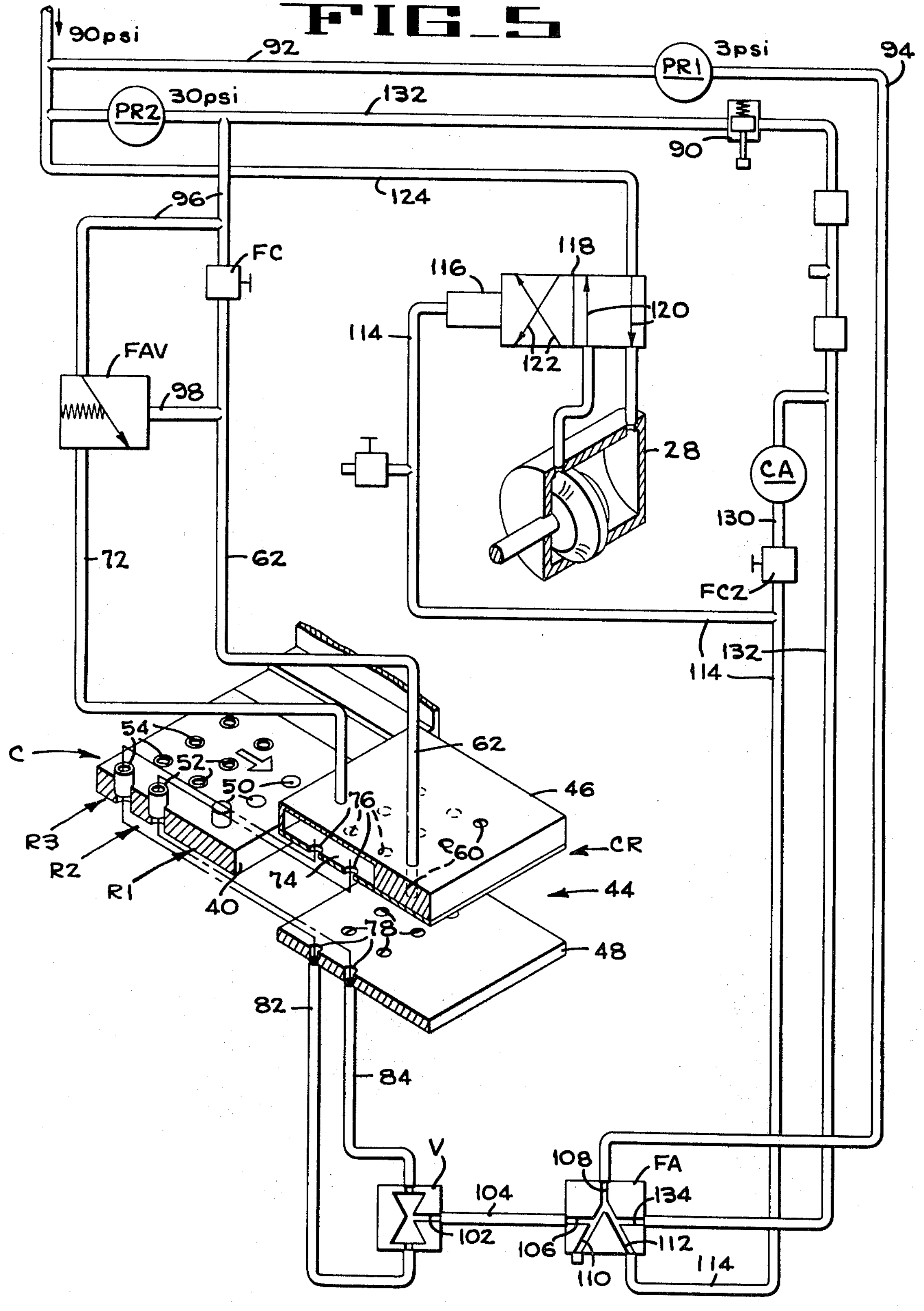
FIG. 5 is a diagram of the fluidic sensing, logic and switching control circuit.
Figure 6:
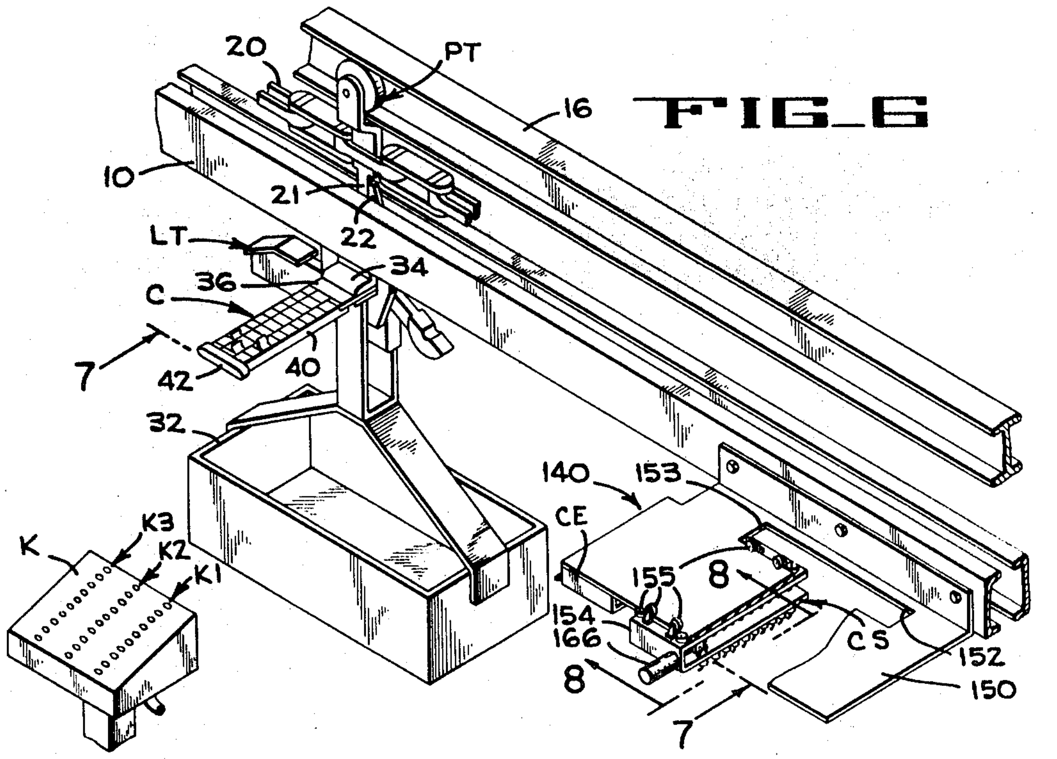
FIG. 6 is a schematic perspective showing one of the FIG. 1 trolleys and its escort memory approaching an automatic code erasing and resetting unit.

With more detailed reference to the function set forth above, the fluidic control circuit of FIG. 5 is supplied with input air at 90 p.s.i. through an inlet pipe 92. A pressure regulator PR1 and a conduit 94 supply air at 3 p.s.i. to a bistable fluid amplifier FA. A second pressure regulator PR2 and a conduit 96 supply air at 30 p.s.i. to a fluid amplifier valve FAV which senses the previously mentioned back pressure in the air supply tube 62 and pressurizes the plenum chamber 74 to control the amplifier FA to energize the air cylinder 28 when such back pressure occurs, and the openings in buttons 52 and 54 align with the openings 76 in the pressurized plenum chamber 74.

The amplifier valve FAV is a conventional, fluidic piloted normally closed diaphragm type 3 way air valve. A characteristic of this type of valve is that its control spool is switched by a fluidic signal and it has no mechanical switching components in the usual sense of springs, pistons and the like.

The bistable fluid amplifier FA is a conventional fluidic control element, also known as a flip-flop. Internally, an inlet passage branches out to form two separate output passages which form a V with the inlet passage. Lateral control passages intercept the output passages near their juncture with the inlet passage. Air from the inlet passage flows through one of the output passages and can be switched from one passage to the other by a momentary air signal through the control passage which is adjacent the passage from which the air is to be switched.

With the conduit 92 supplying air to the fluidic control circuit, and with the selector button 50 and coding buttons 52 and 54 active and in a coding pattern which will cause the air cylinder 28 to be energized and pivot the switching track 24 to divert the approaching load trolley LT, the operation is as follows: Selector button 50 on the incoming coding unit C will align vertically with the air supply tube 62. At this instant the selector button blocks the passage 60 (FIG. 3) and creates a back pressure in the tube 62. It will be noted that the air supply tube is provided with a variable flow control FC and a line 98 downstream (relative to incoming air) of the flow control. Thus, the back pressure flows into the line 98 and actuates valve FAV to supply air from the conduit 96 into the conduit 72 which supplies the plenum chamber 74.

Because the tubular coding buttons 52 and 54 are in active positions and are aligned with two of the outlet passages 76 (FIG. 3) from the plenum chamber, air is transferred by the coding buttons into the conduits 82 and 84. In series connection with the conduits are the aligned throats 100 of a venturi element V. The venturi passage is formed internally of a block with a lateral central passage 102 that intersects the constricted portion of the venturi passage so that with one way flow through either conduit 82 or 84 a negative pressure is developed in a control conduit 104 that connects to the central passage 102. In the present instance there is no such flow through the venturi passage because each conduit 82 and 84 is supplying air at the same volume and pressure. Accordingly, the air in the venturi passage flows out of the lateral passage 102 and into the control conduit 104.

A control port 106 of the fluid amplifier FA is connected to the control conduit 104. Therefore, the 3 p.s.i. air supply through the conduit 94 to the inlet passage 108 of the fluid amplifier is transferred (the air is normally directed through a vent passage 110 as later described) to an outlet passage 112. Passage 112 is connected to a conduit 114 which actuates a pilot control 116 for a two-position, four connection air valve 118. This shifts the core of the valve so that the straight valve passages at 120 are replaced by the crossed valve passages at 122 to transfer air from a conduit 124 into the piston rod end of the air cylinder 28. The piston rod of the air cylinder 28 is thus retracted to pivot the switching track 24 (FIG. 1) into alignment with the spur track 14.

While the piston rod of the air cylinder 28 is retracted, air is bled from the conduit 114 into a conduit 130 which includes a variable flow control FC2 and a capacitor CA, in series, and connects to a conduit 132 that communicates with a control passage 134 of the fluid amplifier FA. When the restricted flow of air builds up in the capacitor CA (the latter being a closed vessel), it flows through the conduit 132 into the control passage 134 and switches the air from the outlet passage 112 to the vent passage 110. This provides a time interval for the switching track 24 to dwell in its switched position aligned with the spur track 14, and the time interval can be adjusted by regulating the flow control FC2.

The conduit 132 communicates with the conduit 96 and is controlled by the normally closed air switch 90. After a certain number of load trolleys LT accumulate on the spur track 14, the last trolley rests against the actuator of the switch 90. This opens the air switch and supplies air at 30 p.s.i. to the control passage 134 of the fluid amplifier FA, whereby the inlet air is switched to the vent passage 110. Therefore, if the coding unit C of another load trolley is destined for this same spur track, the venturi V will direct air into the control passage 110 but the air is at the same pressure as the air entering the control passage 134. The fluid amplifier FA, therefore, will not switch from the vent passage 110 and the trolley will not be diverted from the main track until there is space enough for the last trolley on the spur track to clear the air switch 90 and allow it to close. Since the switch 90 is opened by each passing load trolley after the coding unit C has passed the code reading unit CR, there is no air pressure in the conduit 104 to oppose the 30 p.s.i. air pressure transmitted through the air switch 90 into the conduit 132 and into the control passage 134. The 3 p.s.i. inlet air which has been directed to the outlet passage 112 is thus switched to the vent passage 110 and the fluidic system is restored to its former condition by each passing trolley.

In some cases the selector button 50 might align with the conduit 62, even though its coding buttons are not aligned with the plenum passages 76. Under these circumstances the back pressure in conduit 62 will switch air into the plenum chamber 74 as already described, but the air is not conducted to the venturi inlet conduits 82 and 84.

The fluid amplifier FA thus remains in its last described (and initial) condition, and no switching of the load trolley will occur. In other instances the selector button 50 and one coding button 52 or 54 might be respectively aligned with the conduit 62 and a plenum passage 76. As a result, either the conduit 82 or the conduit 84 will supply air to the venturi V. Because one conduit is open to atmosphere, there is one-way air flow through the venturi passage. This effects a negative pressure in the conduit 104, whereby the air being vented through the passage 110 of the fluid amplifier FA continues to be vented. While the fluid amplifier FA is bistable and is designed to maintain air flow in whichever position it is in until a control pulse switches the flow, the venturi provides extra assurance that the flow will not switch because it provides a negative pressure to maintain the desired flow position.

The number of permissible three digit codes with ten each of the coding buttons 52, 54 and of the selector buttons 50, is 1000. The possibility of 1000 destination stations will meet the requirements of all but the very largest installations, but the compactness of the components makes it feasible to easily enlarge the system—to 1728 stations for instance, by adding only two buttons to each row. Another feature is that any load trolley can be routed to one of several destinations by setting more than one code on the coding unit C.

The above described apparatus lends itself readily to semi-automatic code erasing and code setting mechanisms, one embodiment of which is illustrated in FIGS. 6–9 and combines both the erasing and setting functions in a single unit 140. An outwardly projecting bracket 150 is part of the code erasing and code setting unit, and is secured to the track 10 near the start of the track system. The approaching coding unit C of the load trolley LT progresses first through a stationary code erasing section CE where all of the active raised coding and selector buttons are cammed down to inactive positions, and then engages a movable code setting unit CS which rolls along the bracket 150 for a short distance while a selected pattern of coding buttons are set to active positions. The code setting unit CS is controlled by the attendant who visually determines the destination of the load trolley by its contents or by a route list included with the material being carried.

For purpose of the present disclosure, it is assumed that the load trolleys LT are to be routed individually or in successive groups to selected spur track destinations, and that the attendant fixes the codes by operating a keyboard K near the code erasing and code setting units CE and CS. The keyboard includes rows K1, K2 and K3 of selector buttons which correspond to the rows R1, R2 and R3 of coding and selector buttons. As each trolley coding unit C enters the code setting unit CS, one coding or selector button in each of the rows R1, R2 and R3 is raised to an active position by one depressed keyboard button as controlled by the attendant. If the three depressed keyboard buttons remain depressed, successive load trolleys LT will receive the same code pattern. A mechanical release may be incorporated into the keyboard so that when three other keyboard buttons are depressed, all previously active buttons are rendered inactive.

With more specific reference to the structure, the bracket 150 (FIG. 6) of the code erasing and code setting units CE and CS is provided with an elongate aperture 152 which has an upstream edge 153 that serves to limit the upstream movement of a carriage 154 for the code setting unit CS. Rollers 155 support the carriage for rolling movement along the bracket 150. A tension spring 156 maintains the carriage 154 in its upstream position until one of the coding units C is engaged with the carriage. The carriage is then moved downstream by and with the coding unit while a new coding pattern is set, the carriage is released, and the spring 156 returns the carriage to its initial position.

The code erasing unit CE (FIG. 7) includes an overhead cam 158 which is as long as the rows R1–R3 of coding and selector buttons so that the rows of buttons are successively cammed down to inactive positions when the coding unit C progresses under the fixed cam 158 and over a fixed support plate 160. Plate 160 is provided with a ramp 162 to engage the guide shoe 42 because the leading edge of the guide shoe is behind the leading edge of the coding unit body 40, for a reason presently described.

Figures 7, 8, 9:
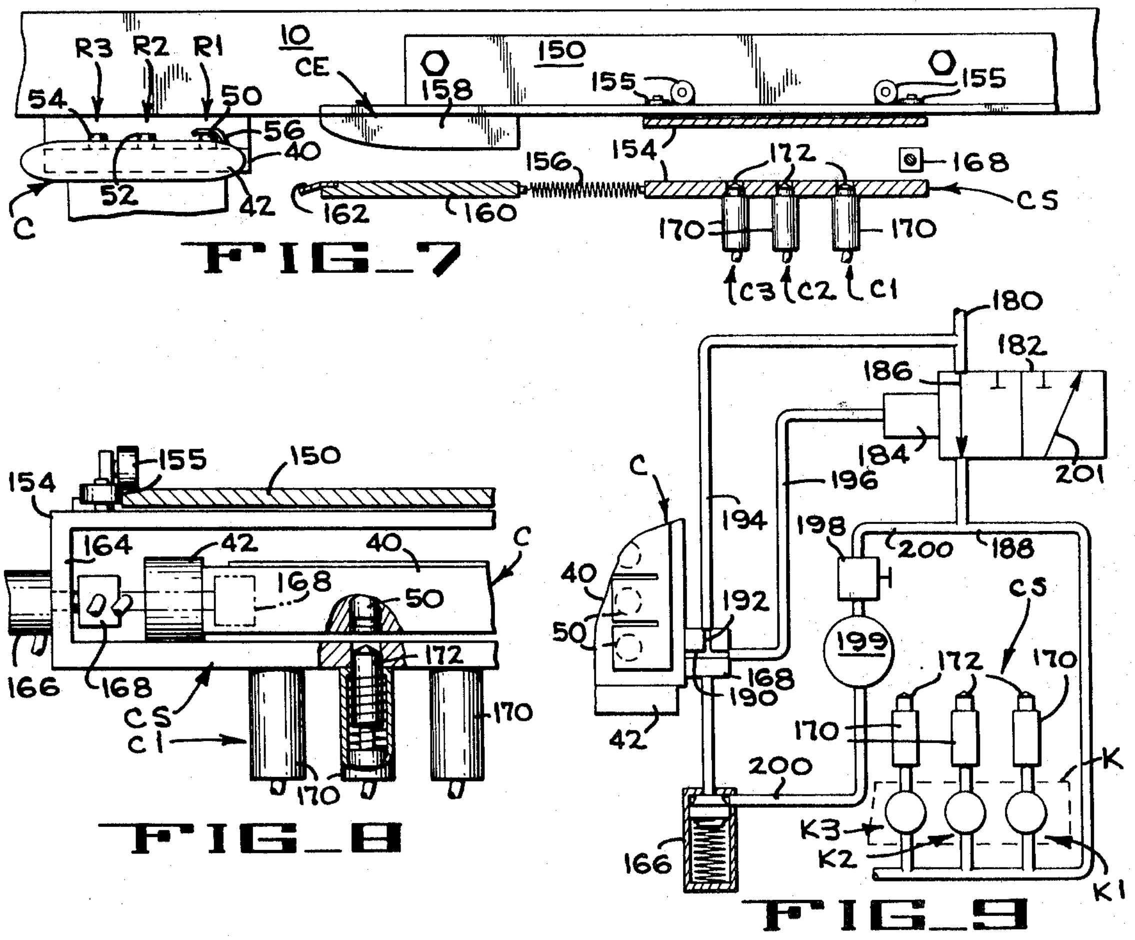
FIG. 7 is a section taken along lines 7—7 on FIG. 6.
FIG. 8 is a section taken along lines 8—8 on FIG. 6.
FIG. 9 is a diagram of the fluidic control circuit which controls the code erasing and resetting unit shown in FIG. 6.

The carriage 154 is of inwardly open U-shape with an outer vertical wall 164 (FIG. 8). A single-acting air-operated cylinder 166 is mounted on the wall 164 and its piston rod is normally extended and carries a ported control block 168. When the piston rod is retracted, the control block lies clear of the coding unit C, and when extended, the control block is in position to be contacted by the leading wall of the coding unit body 40, as best shown in FIGS. 8 and 9, whereby the carriage 154 is moved downstream in indexed relation with the coding unit C. Thus indexed, rows C1, C2 and C3 of air-operated code button reset cylinders 170 that are mounted on the carriage are in vertical alignment with the rows R1, R2 and R3 of coding and selector buttons 50, 52 and 54. According to which keyboard buttons are depressed, the corresponding reset cylinders are energized to project their individual plungers 172 upward and push the corresponding coding and selector buttons into active positions.

The air circuit which governs the code setting apparatus CS is shown in FIG. 9 and includes an air input line 180 that is controlled by an air valve 182 having an air operated pilot 184. With the pilot in its energized position, a valve passage 186 communicates with a conduit 188. Branch lines of the conduit 188 are separately connected to the code button reset cylinders 170 and are individually controlled by one of the buttons of the rows K1, K2 or 23 of keyboard buttons. Thus, the plungers 172 of the active keyboard buttons are projected upward to set the coding and selector buttons 50, 52 and 54 indexed therewith.

Air is automatically supplied to the rows K1, K2 and K3 of keyboard buttons when the control block 168 is contacted by the coding unit C so that a passage 190 of the control block is covered. A branch passage 192 and a flexible tube 194 supply air to the passage 190. Until the coding unit body 40 covers the passage 190, the air exhausts through the passage, but when the passage is covered, the air is directed into a flexible tube 196 to actuate the pilot 184 and thus energize the code button reset cylinders 170 as described. In order to retract the control block 168 after a short time interval sufficient for the selected coding and selector buttons to be reset, a timing circuit comprising a variable flow control valve 198 and a capacitor 199 are in series connection in a flow line 200. The line 200 is connected to the valve 182 and the cylinder 166, so that when air is directed into the conduit 188, a small part of the air bleeds into the timing circuit. When the volume of air in the timing circuit is sufficient to energize the cylinder 166, the control block 168 is retracted and the pilot 184 is deenergized. A vent passage 201 of the air valve 182 vents the line 188, and the code reset cylinders 170 are thereby deenergized. As soon as the plungers 172 drop out of the coding unit C, the carriage 154 is returned by the spring 156 and the coding unit continutes on its way with its new code pattern.

From the preceding description, it is believed evident that the disclosed fluidically controlled trolley conveyor system has important advantages over the conventional electro-pneumatically controlled conveying systems. One of the most important advantages is in the system reliability and longevity because the sensing and logic functions are effected with minimal moving parts. At the same time, the apparatus can be used in environments which prevent the use of conventional control devices, or require special precautions such as sealed housings, fail-safe circuits, and the like. Thus, the present invention is well adapted for use in explosive environments, for extremes of temperature which would prevent the use of electro-pneumatic controls, or in conditions where electrical shock hazards exist. Further important aspects of the invention are that installation and maintenance costs are minimized and the air mode of operation is uniform throughout the system, in contrast to systems which use a combination of air, hydraulic and electrical components.

Although the best mode contemplated for carrying out the present invention has been herein shown and described, it will be apparent that modification and variation may be made without departing from what is regarded to be the subject matter of the invention.

What is claimed is:

1. In a trolley conveyor system including a plurality of movable conveying units, a main track guiding said units along a predetermined path, and a pivotable switching track for selectively diverting conveying units from said main track, the improvement comprising a fluidic coding unit carried by each conveying unit and capable of displaying a preselected destination code, a fluidic code reading unit mounted adjacent the switching track and displaying a station code, said code reading unit being arranged to momentarily index with a moving coding unit, a fluidic control circuit operatively associated with the code reading unit and arranged to substantially instantaneously compare the destination and station codes when the coding and code reading units are indexed, and power means governed by said control circuit for pivoting the switching track when said destination and station codes match.

2. Apparatus according to claim 1 and cooperatively associated conditioning means in said coding and code reading units for activating said fluidic control circuit only when said units are in indexed relation.

3. In a trolley conveyor system including a plurality of movable conveying units, a main track guiding said units along a predetermined path, and a pivotable switching track for selectively diverting conveying units from said main track, the improvement comprising a fluidic coding unit carried by each conveying unit and capable of displaying a preselected destination code, a carriage displaceable in the direction of movement of said coding unit, means for temporarily arresting a coding unit in indexed relation with said carriage so that the carriage and coding unit move briefly together, code setting means mounted on said carriage for setting the destination code on said coding unit during the coextensive movement of said code setting means and said coding unit, a fluidic code reading unit mounted adjacent the switching track and displaying a station code, said code reading unit being arranged to momentarily index with a moving coding unit, a fluidic control circuit operatively associated with the code reading unit and arranged to substantially instantaneously compare the destination and station codes when the coding and code reading units are indexed, and power means governed by said control circuit for pivoting the switching track when said destination and station codes match.

4. In a trolley conveyor system including a plurality of movable conveying units, a main track guiding said units along a predetermined path, and a pivotable switching track for selectively diverting conveying units from said main track, the improvement comprising a fluidic coding unit carried by each conveying unit and capable of displaying a preselected destination code, a code setting unit for setting the destination code on a moving coding unit, said code setting unit including a carriage displaceable in the direction of movement of said coding unit, means for temporarily arresting a coding unit in indexed relation with said carriage so that the carriage and coding unit move briefly together, code setting means mounted on said carriage for setting the destination code on said coding unit during the coextensive movement of said code setting means and said coding unit, remotely operable control means for controlling said code setting means, a fluidic code reading unit mounted adjacent the switching track and displaying a station code, said code reading unit being arranged to momentarily index with a moving coding unit, a fluidic control circuit operatively associated with the code reading unit and arranged to substantially instantaneously compare the destination and station codes when the coding and code reading units are indexed, and power means governed by said control circuit for pivoting the switching track when said destination and station codes match.

5. Apparatus according to claim 4 wherein said code setting unit includes destination code erasing means, said erasing means removing said destination codes prior to the actuation of said code setting means.

6. In a conveyor control system including a plurality of movable trolley conveying units, a main track guiding said units along a predetermined path, a spur track intersecting said main track, and a pivotable switching track intermediate the spur track and the main track for selectively diverting conveying units from said main track onto the spur track, the improvement comprising a coding unit carried by each conveying unit and defining a pattern of through passages, said coding unit including means for selectively opening or blocking said passages in a predetermined code pattern, a stationary code reading unit adjacent the switching track, said code reading unit defining a plurality of aligned inlet and outlet air passages capable of straddling alignment with the through passages of a moving coding unit, fluidic control means operatively associated with the code reading unit and selectively responsive only to a predetermined pattern of open and blocked through passages in said coding unit, and a fluid operated cylinder governed by said control means and connected to the switching track to pivot the switching track when said predetermined pattern of passages actuates said control means.

7. In a conveyor control system, a conveyor trolley movable along a predetermined path, a coding unit mounted on said conveyor trolley, a code reading unit mounted at a fixed location along said path, said code reading unit including means for projecting and receiving two separate air streams of equal pressure across said path, said coding unit including means for selectively blocking or transmitting said air streams, a venturi element having inlet and outlet throats in series connection with said air stream receiving means and a control conduit communicating with the constricted portion of the venturi element, and a fluidic control circuit including a bistable fluid amplifier having a control passage connected to the venturi control conduit, the control passage thus producing a positive pressure signal to said fluid amplifier when both air streams are transmitted to said venturi element, and a negative pressure signal when only one air stream is transmitted to said venturi element.

8. In a trolley conveyor system including a plurality of movable conveying units, a main track guiding said units along a predetermined path, a spur track intersecting said main track, and a pivotable switching track intermediate the spur track and the main track for selectively diverting conveying units from said main track onto the spur track, the improvement comprising a coding unit carried by each conveying unit and including a plurality of air transmitting passages, means for selectively opening or blocking each of said passages in a predetermined code pattern, a code reading unit mounted adjacent the switching track, said code reading unit defining a plurality of aligned inlet and outlet air passages capable of straddling alignment with the air passages of a moving coding unit, fluidic control means operatively associated with the code reading unit and selectively responsive only to a predetermined pattern of open and blocked through passages in said coding unit, and power means governed by said control means for pivoting the switching track when said control means is actuated.

9. In a trolley conveyor system including a trolley movable along a track among successive destination stations, a stationary station code reading unit adjacent each station, each code reading unit including a transmitting member having a station code pattern of air outlet passages and a receiving member spaced therefrom and having a like station code pattern of air inlet passages, said members together defining an open slot, a destination coding unit mounted on said trolley and movable through the slots of said code reading units, said destination coding unit having selectively positionable destination code means for either blocking the air from said outlet passages or transmitting the air to said outlet to said inlet passages, and a fluidic control circuit connected to selected air outlet and inlet passages, said fluidic control circuit being arranged to sense the destination code of said destination coding unit and compare it with the station code pattern of air passages in said code reading unit.

10. In a trolley conveyor installation including a plurality of trolleys movable along a track among successive destination stations, a trolley control system for routing the trolleys to preselected destination stations comprising a stationary code reading unit adjacent each station, each code reading unit including a perforate air transmitting member having a coding pattern of air outlet passages and a perforate air receiving member having a like coding pattern of air inlet passages, said members together defining a slot open in the direction of trolley movement, a coding body mounted on each trolley and movable through the open slots of said code reading units, said coding body carrying a pattern of destination coding buttons selectively positionable to either block the air from said outlet passages or to transmit the air to said inlet passages, and a fluidic sensing and logic control circuit connected to selected air outlet and inlet passages, said control circuit being arranged to sense the destination code of said coding buttons and compare the code with the coding pattern of air passages in said code reading unit.

11. Apparatus according to claim 10 wherein said code reading unit includes dual air outlet passages and dual air receiver conduits aligned with said passages, means for supplying air under the same pressure to said outlet passages, a venturi element in series connection with said air receiver conduits, a control conduit communicating with the constricted portion of the venturi passage in said venturi element, and a coding unit arranged to selectively stop or permit free flow of air from one or both of said outlet passages to said air receiver conduits, a balanced or unbalanced flow of air into said air receiver conduits thus resulting so that said control conduit respectively supplies two distinct control pressures, a positive pressure and a negative pressure.

12. Apparatus according to claim 10 wherein said code reading unit includes a fluidic amplifier controlling said power means, a venturi element having a control conduit communicating with the constricted portion of said venturi element and with a control port of said amplifier, and means including said coding unit for supplying air at the same pressure simultaneously to the aligned throats of said venturi element, or to only one of said throats, the control passage of said amplifier being thus respectively governed by a positive pressure substantially the same as the initial pressure supplied to said aligned throats, or by a negative pressure.

13. In a conveyor system including a plurality of movable trolley units, a main track guiding said units along a predetermined path, a spur track intersecting said main track, and a pivotable switching track intermediate the spur track and the main track for selectively diverting conveying units from said main track onto the spur track, the improvement comprising a coding unit carried by each conveying unit, said coding unit including means for selectively opening or blocking a plurality of air passages in a predetermined code pattern, a code reading unit adjacent the switching track, said code reading unit defining a plurality of inlet and outlet air passages capable of straddling alignment with the through passages of a moving coding unit, fluidic control means operatively associated with the code reading unit and responsive only to a predetermined pattern of open and blocked through passages in said coding unit, an air cylinder governed by said control means and connected to the switching track to pivot the switching track when said predetermined pattern of passages actuates said control means, and a normally closed air switch mounted on said spur track in position to be opened by a trolley unit, said switch supplying an air control pulse to said fluidic control means to prevent another trolley unit being diverted from the main track to the spur track.

14. In a trolley conveyor system including a plurality of movable conveying units, a main track guiding said units along a predetermined path, and a pivotable switching track for selectively diverting conveying units from said main track, the improvement comprising a fluidic coding unit carried by each conveying unit and capable of displaying a preselected destination code, said coding unit including a plurality of air passages each having selectively operable means to either open or close the associated passage to form said destination code, a fluidic code reading unit mounted adjacent the switching track and displaying a station code, said code reading unit being arranged to momentarily index with a moving coding unit, a fluidic control circuit operatively associated with the code reading unit and arranged to substantially instantaneously compare the destination and station codes when the coding and code reading units are indexed, and power means governed by said control circuit for pivoting the switching track when said destination and station codes match.

References Cited

UNITED STATES PATENTS

| | | | |
|---|---|---|---|
| 3,361,384 | 1/1968 | Thorburn | 243—16 |
| 3,406,928 | 10/1968 | Thorburn | 243—5 |

JAMES B. MARBERT, Primary Examiner

R. SAIFER, Assistant Examiner

U.S. Cl. X.R.

198—38